United States Patent [19]

Hawkins et al.

[11] 4,402,122

[45] Sep. 6, 1983

[54] TOOL FOR INSTALLING METAL CLIPS

[75] Inventors: Ronald G. Hawkins, Massena; Edward J. Davoy, Norwood; Robert M. Hooker, Brushton; John E. Muniak, Massena, all of N.Y.

[73] Assignee: Aluminum Company of America, Pittsburgh, Pa.

[21] Appl. No.: 319,949

[22] Filed: Nov. 10, 1981

[51] Int. Cl.³ .............................................. B23P 11/00
[52] U.S. Cl. ................................................. 29/243.56
[58] Field of Search ................. 29/243.56, 243.5, 235; 254/248, 249

[56] References Cited

U.S. PATENT DOCUMENTS 1,664,529  4/1928  Schroeder .......................... 29/243.5
4,083,164  4/1978  Hagedorn .......................... 29/243.56

Primary Examiner—James L. Jones, Jr.
Attorney, Agent, or Firm—Elroy Strickland

[57] ABSTRACT

A device for placing spring metal clips in locking engagement with the ends of spacing members. One embodiment of the device comprises a center member and two right angle members disposed adjacent the respective ends of the center member and in a manner that places one leg or extension of the right angle members in a generally perpendicular relationship to the longitudinal axis of the center member. Mechanical linking means connect the two right angle members to the center member in a manner that permits relative longitudinal and parallel movement between them. The linking means includes two pivotal handles spaced apart along the length of the center member for effecting relative longitudinal movement of the center and right angle members. A third member is disposed at the end of the leg or extension of each right angle member that is perpendicular to the center member, and configured to engage the base of a clip. Each of the third members is respectively mechanically connected to the right angle members in a manner that permits rotation of the third member relative to the associated right angle member. Means are provided on the right angle and third members to force the legs of the clips (being placed into locking engagement with a spacing member) to close on the spacing member. This insures that the legs will be in position to lock on the spacing member.

11 Claims, 4 Drawing Figures

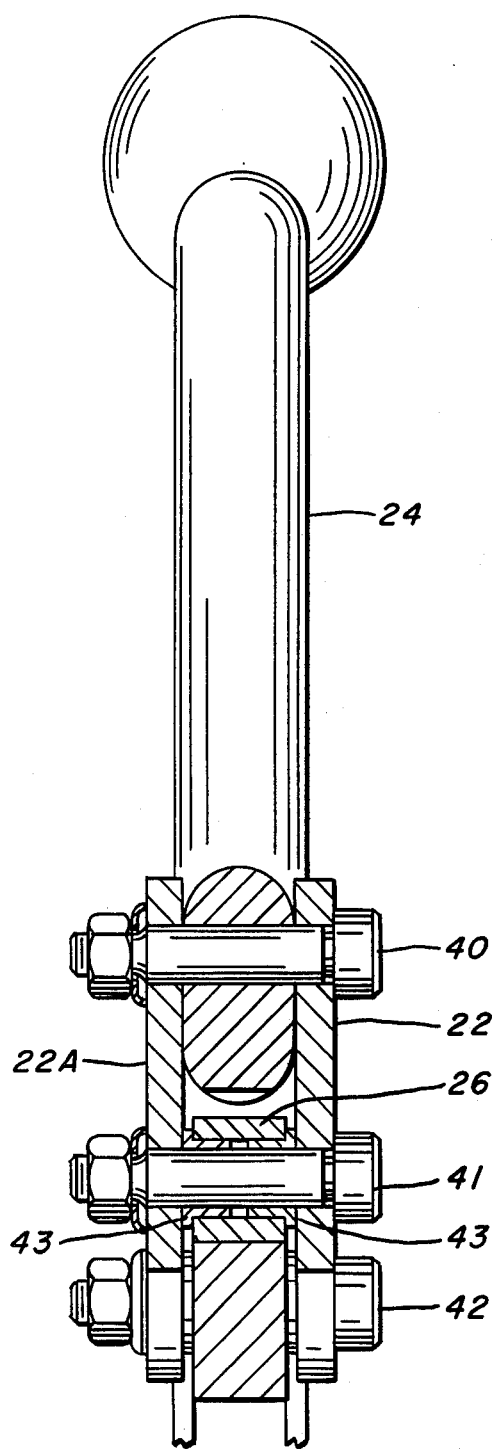
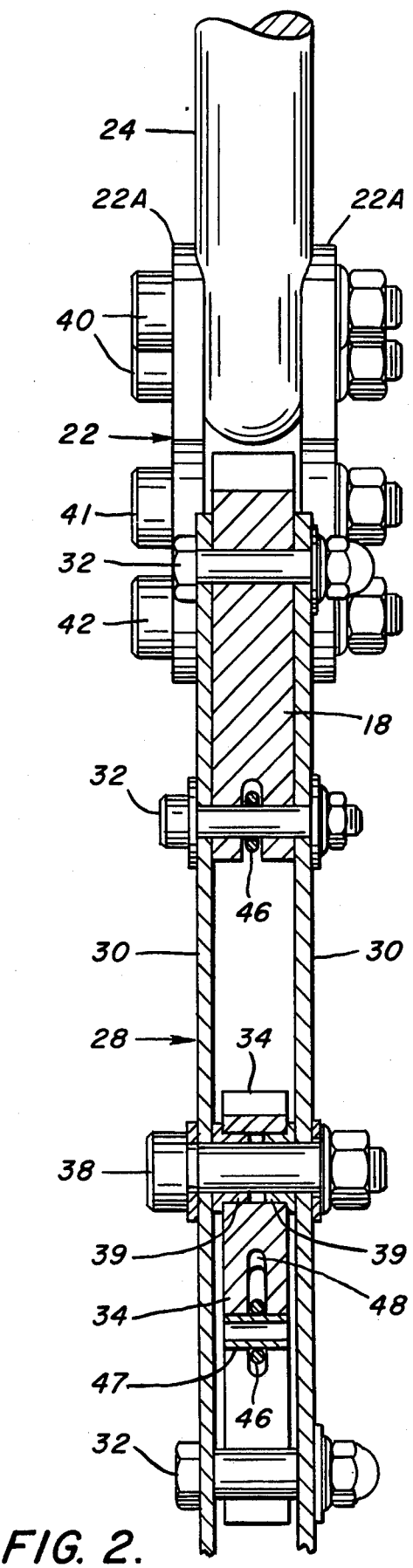
FIG. 3.
FIG. 2.

TOOL FOR INSTALLING METAL CLIPS

BACKGROUND OF THE INVENTION

The present invention relates to a hand-held tool or device for rapid installation by hand of spring metal clips onto the ends of spacing members.

In U.S. Pat. No. 4,178,467 to Hawkins, one of the present inventors, a device is disclosed for spacing two conductors of an electrical line or of a two-conductor "bundle". The spacing device includes a center spacing member and inner elastomer bushings located on the ends of the spacing member. The two conductors of the bundle seat in respective receiving surfaces of the inner bushings, and an outside bushing, having a spring metal clip located on the bushing, is disposed about each of the conductors. The bushings, the spacer member and the conductors are then secured together by the clips disposed in locking engagement with the ends of the spacing member.

Any spacing device for an electrical transmission line, for example, has a total cost to consider, i.e. the cost of manufacturing the spacing device and the cost of its installation in the field. The above-mentioned spacing device has a low manufacturing cost, while the tool of the present invention completes the cost picture by providing an economical means to rapidly install the above and similar spacing devices. However, the present invention is not limited to installing the above device, as embodiments of the subject tool are effective to install one or more clips into locking engagement with any type of spacing means having an elastomer bushing or other resilient means disposed about a conductor or cable. Examples of such spacing means are shown in U.S. Pat. Nos. 3,617,609 and 3,870,815 to Tuttle and Hawkins, respectively.

BRIEF SUMMARY OF THE INVENTION

The present invention provides such an economical installation tool. In one embodiment the tool includes a center member and two generally right angle members located adjacent the ends of the center member, the two right angle members being mechanically linked to the center member by means that provide relative parallel longitudinal movement of the three members. Each of the right angle members has a leg extending generally perpendicular to the longitudinal axis of the center member, and a third, clip-engaging member rotatably mounted at the end of the perpendicular leg. The distance between the perpendicular legs of the two right angle members corresponds to the length of the spacing member to be mounted between two conductors. Hence, the installation tool can be placed at the ends of the spacing device after clips are disposed around bushing members located at the ends of the spacing member (and around the conductors), with the rotatable third members being disposed in alignment with the clips. The mechanical linking means that join the right angle and center member together include two spaced-apart handles that rotate about center and right angle members. A second set of fixed handles is located adjacent to but outside of the locations of the pivotal handles. The workman uses fixed handles to place the tool in alignment with the spacing member and clips, the workman then grasping the rotatable handles. The workman rotates the same toward each other to engage the base of the clips and thereby move the clips toward each other until locking ends of the clips reach slots or openings provided in the spacing member. The locking ends of the clips then snap into locking engagement with the spacing member.

The right angle and clip-engaging members are both provided with means to engage and force opposed legs of each clip toward the spacing member. This insures that the legs close on the spacing member so that inwardly extending fingers of the legs enter the slots of the spacing member to lock against the member.

Spring means are employed to return the pivotal handles to an open "at rest" position and the rotatable clip-engaging third members to a position for receiving the next set of clips to be mounted.

THE DRAWINGS

The invention, along with its objectives and advantages, will be best understood from consideration of the following detailed description and the accompanying drawings in which:

FIG. 1 is a side elevation view of one embodiment of the installation tool of the invention, the tool being shown located about the spacing device of U.S. Pat. No. 4,178,467;

FIG. 2 is a sectional view of the tool taken along lines II—II of FIG. 1;

FIG. 3 is a sectional view of the tool taken along lines III—III of FIG. 1; and

PREFERRED EMBODIMENTS OF THE INVENTION

Figure 1:
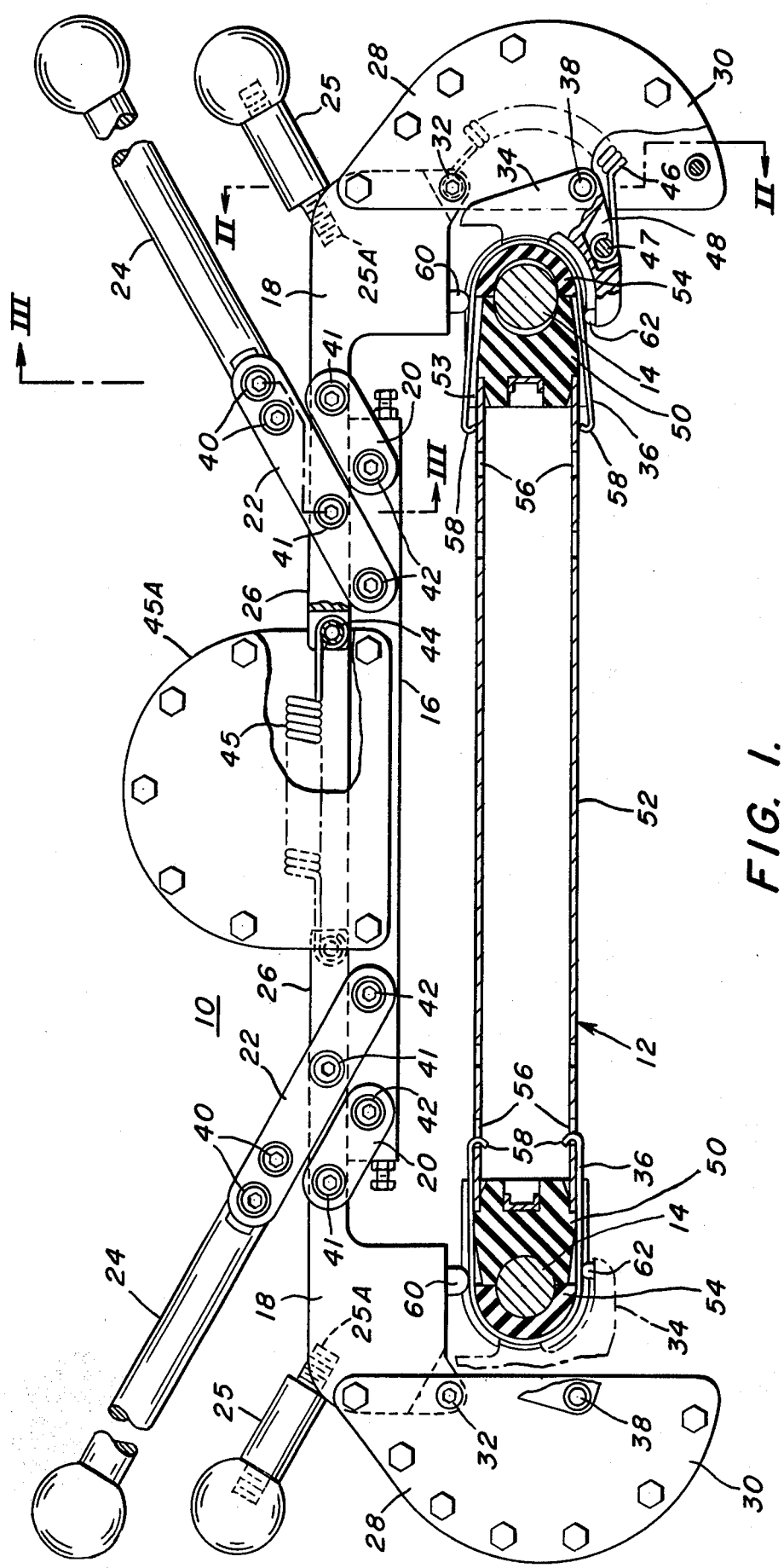

Referring now to FIG. 1 of the drawings, a side elevation view of a tool 10 is shown disposed about a device 12 (in plan view) for spacing two parallel conductors 14. The tool includes an elongated center member 16 and two generally right angle members 18 mechanically linked to the center member by four (two for each right angle member) link means 20 and 22. The right angles are identical structures, as are the link means 20 and 22, except that link means 22 are extended to provide a structure that secures two outwardly extending handles 24 to the center and right angle members. Link means 20 and 22 permit handles 24 to be rotated in a manner explained hereinafter.

Two additional handles 25 are provided, as shown in FIG. 1, at locations outside of handles 24. Handles 25 are fixedly attached to the outward extremity of the right angle members 18, such as being threaded into tapped openings 25A provided in the members.

Each member 18 in FIG. 1 has a leg or extended portion 26 that is disposed over and in parallel relationship with center member 16. Members 18 have another leg 28 extending downwardly in FIG. 1 and in a generally perpendicular direction to the parallel leg 26 and the longitudinal axis of center member 16. Legs 28 have a half-round configuration in elevation and, as best seen in FIG. 2, are comprised of two flat members or plates 30 bolted at 32 to 18 adjacent the outward extremity of 18.

At the lower end of each leg 28 (and flat members 30) is located a third member 34 (of the basic tool of structure 10) for engaging the base of a spring metal clip 36, only partially visible between bushings 50 and 54 in FIG. 1. The third members 34 are rotatably bolted to the lower end of legs 28 of the right angle members at 38, bolt 38 extending through flat members 30 and a flanged bushing 39, as best seen in FIG. 2.

Referring now to FIG. 3, mechanical links 22 (only one of which is visible in FIG. 3) comprise two flat members 22A disposed against opposed sides of handle 24 and located on opposed sides of members 16 and 26. Flat members 22A are tightly secured to the handle by two bolts 40, only one of which is visible in FIG. 3. Bolts 41 rotatably secure link members 20 and 22 (flat members 22A in FIG. 3) to the respective legs 26 of right angle members 18. Similarly, bolts 42 rotatably connect links 20 and 22 to the center member 16. Flanged bushings 43 are disposed around the shanks of bolts 41 and 42 (though only the one on 41 is visible in FIG. 3) to facilitate rotation of links 20 and 22 about the bolts, and movement relative to members 16 and 26. This provides parallel movement of the center and right angle members when handles 24 are moved relative to each other.

Connected to and between the ends of the opposed legs 26 of the right angle members at pin locations 44 (FIG. 1) is a coil spring 45. A set of plates 45A (only one of which is visible in FIG. 1) can be attached to member 16 to provide a protective shield spring 45. A similar, but smaller, coil spring 46 is connected to and between each right angle member 18 and each clip-engaging third member 34. As seen in FIGS. 1 and 2, the upper end of each spring 46 is connected to 18 by bolt 32, while the lower end is connected to the third member by a pivot pin 47 located in a hollow portion 48 provided in the rear of the third member. Flat members 30 also serve to shield springs 46.

The operation of tool 10 is as follows. When, for example, a spacing device 12, such as shown in FIG. 1, is to be installed on a two-conductor bundle, inner elastomer and resilient bushing halves 50 are first disposed on the ends of a spacing bar or member 52. The conductors 14 (of FIG. 1) are then seated in outwardly facing recesses 53 of the inner bushing halves, spacing bar 52 extending perpendicular to the axes of the conductors. Outer elastomer and resilient bushing halves 54 are now seated over the conductors, as shown in FIG. 1. Clips 36, shown extending between the bushing halves in FIG. 1, are seated in a peripheral recess (not visible in FIG. 1) of the outer bushing halves and extend into similar recesses of the inner bushing halves. This holds the outer bushing halves in place on the conductors 14 while a workman now takes tool 10 of the invention, by grasping handles 25, and disposes the same about the spacer of 12 and conductors 12. The workman aligns the clip-engaging members 34 of the tool with the bases of the respective clips 36. He then moves his hands from handles 25 to handles 24 and pivots or rotates handles 24 toward each other about pivot locations 41 and 42. Spring 45 compresses and bows outwardly as handles 24 approach each other, the handles translating the right angle members 18 toward each other and relative to center member 16 in a parallel manner. This latter function is permitted by links 20 and 22 which pivot about 41 and 42. The clip-engaging members 34 seat and press against the rear of the clips to move the same toward opposed openings 56 provided in spacing member 52 adjacent the ends thereof. As members 34 press against clips 36, the members 34 rotate about their respective bolts 38 and bushings 39 and form opposed pocket areas with right angle members 18 to receive and engage the base of the clips.

As the clips are moved toward openings 56, the bushing halves 50 and 54 are compressed about conductors 14 until inwardly extending fingers 58 of the clips reach openings 56, at which time the fingers snap into place to engage the structure of the spacing member 52. The clips are now locked in place by the resilient force of the bushing halves, which secure the conductors, bushing halves and spacer member together.

The length of each leg 26 of the right angle members can be such that the ends thereof will abut each other when the ends of the clips reach the location of the openings 56 in spacing member 52. This limits travel of members 16 and 18 to tell the workman that the ends of the clips have reached the openings and are secured in place.

When the third member 34 presses against the base of its respective clip 36 under the workman's exertion on handles 24, the legs of the clip tend to spread apart about the bushings so that the fingers 58 of the clip are not in position to enter openings 56 and lock with the spacing member 52. To close the legs of the clip on the spacing member, the right angle and clip-engaging members are each provided with opposed protrusions 60 and 62, respectively, these protrusions engaging the opposed legs of each clip as the handles 24 are operated to translate the clips into locking engagement with the spacing member. 60 and 62 are preferably boss structures removably mounted on opposed surfaces of 18 and 34 so that they can be replaced if they wear in the process of disposing clips on spacer means.

When the workman completes translation of the clips into locking position, spring 45 returns members 16 amd 18 and handles 24, to an open, at rest position for the next installation operation. Similarly, springs 46 return the clip-engaging members 34 to a ready position for seating against the next set of clips to be installed.

It can be appreciated from the views of FIGS. 1 to 3 that the force exerted by the workman in the installation process is aligned with the axis of the spacer member 12, the handles 24 and 25 being located directly over the spacer member. In this manner, balanced loading is effected. Balance in loading and force exertion is also the result of the symmetry of handles 24 with respect to the longitudinal center of the spacer, as seen from the side elevation view of FIG. 1. Balance is maintained by the links 20 and 22, as the relative movement of the main members 16 and 18 forms a parallelogram.

Further, the length of rotatable handles 24 is such that a substantial mechanical advantage is provided for the clip installing process. For this reason, the exertion or force required of the workman in installing clips 36 is minimal.

It will be noted that handles 25 are fixed, i.e. do not rotate or pivot. Such fixed handles facilitate aligning the tool 10 with the spacer 12 and clips 36, as the handles 24, being rotatable, tend to translate members 18 toward each other before the tool can be placed about the spacer.

In addition, all components of the tool 10 are either hardware items directly available in the marketplace or easily fabricated. The result is a highly economical tool.

Figure 4:
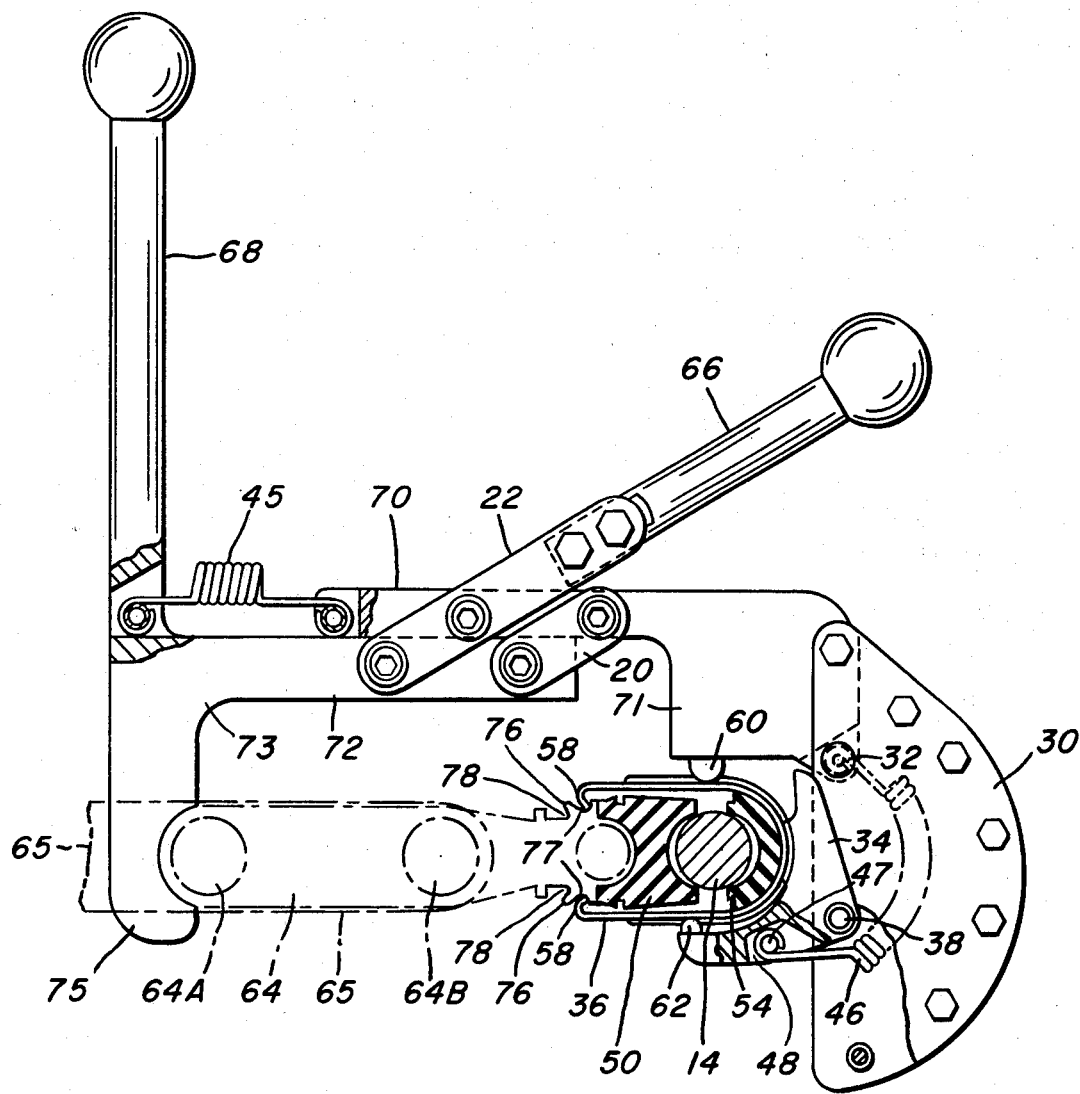
FIG. 4 is a side elevation view of a second embodiment of the invention.

FIG. 4 of the drawing shows a side elevation view of an embodiment of the invention adapted to install a single clip 36 on the conductor connecting end of a spacing member 64. Member 64 is an arm structure employed in combination with a frame 65 (only partially shown in dash outline in FIG. 4) and other identical or similar arm structures (not shown) to space the conductors of an overhead bundle, such as shown in U.S. Pat. Nos. 3,617,609 to Tuttle and 3,870,815 to Hawkins. Hence, the end of the arm opposite the clamp end adjacent conductor 14 is mechanically connected to the frame (at openings 64A and B in 64, as explained in greater detail below) so that the disposal of a clip on the frame or inner end of arm 64 is not involved.

The tool of FIG. 4 comprises one rotatable handle 66 and one fixed handle 68. The rotatable handle 68 is mechanically connected via a link 22 to an arm 70 of a right angle member 71 and to an arm 72 of a second right angle structure 73 so that 71 and 73 can be relatively translated, with the aid of link 20 also, as in the embodiment of FIG. 1, to place a clip 36 in locking engagement with the conductor end of member or arm 64. The fixed handle is shown located adjacent the end of right angle member 73 opposite handle 66. Hence, the right angle members are dimensioned to receive a spacing member 64 between a lower extension 75 of right angle member 73 and clip-engaging member 34, as in the previous embodiment. Unlike the spacing member 52 of FIG. 1, however, and the openings 56 provided in 52, member 64 is provided with opposed projections 76 located between two depressions or indents 77 and 78 provided in the member to receive the locking ends 58 of clip 36. As depicted in FIG. 4, the ends of the clip are seated in initial depressions 77. (In installing a clip on member 64, the workman initially disposes outside bushing 54 and clip 36 over the conductor 14 by hand, and moves the clip and bushing by hand toward the member until the ends 58 of the clip seat in the first depression 77 of the member.)

A spring 45, as in the embodiment of FIG. 1, is connected between handles 66 and 68 to restore handle 66 to an original position after it is rotated toward handle 68.

The right angle member 71, in FIG. 4, is the same as those (18) depicted in FIGS. 1 to 3.

As mentioned above, a rotatable third member 34 is attached to 71 for engaging the base of a clip (36), as depicted in FIG. 4, member 34 being biased in an "open" position by a spring 46 when handle 66 is located in an original position. In addition, 34 and 71 are provided with the opposed protrusions (60 and 62 of the first embodiment) to insure closing of the legs of clips on spacing member 64 in the process of locking the clips on the spacing members.

Hence, the operation of the tool of FIG. 4 is essentially the same as that described in connection with the earlier embodiment. However, in locating the tool of FIG. 4 to effect connection of the spacing member of FIG. 4 with a conductor (14), the lower end of leg 75 of the right angle member 73 is inserted into the frame 65 supporting spacing member 64 and placed against the inner end of the member in the manner shown in FIG. 4. This can be done because such a frame, as shown in the above Tuttle and Hawkins patents, comprises two flat plate structures (65) spaced apart by damping springs and spacer bushings located in openings 64A and B of member 64; leg 75 of the tool is simply inserted between the two plates and disposed against the inner end of spacer member 64.

With the other end of the tool seated against the clip 36 shown in FIG. 4, the workman simply grasps handles 66 and 68 and rotates 66 toward 68 to close bushings 50 and 54 around the conductor (14) and to move the clip toward leg 75 until clip ends 58 seat into the depressions 78 of the spacing member 64. Links 20 and 22 pivot relative to 70 and 72 to allow parallel movement of 70 and 72.

While the invention has been described in terms of preferred embodiments, the claims appended hereto are intended to encompass all embodiments which fall within the spirit of the invention.

What is claimed is:

1. A device for placing at least one clip in locking engagement with a spacing member, the device comprising:
    two right angles members disposed adjacent to each other and dimensioned to receive a spacing member between the right angle members,
    means mechanically connecting the two right angle members together and in a manner that permits relative movement therebetween,
    at least one rotatable handle located to effect such relative movement,
    a third member disposed adjacent one end of at least one of the right angle members and configured to engage the base of a clip, and
    means mechanically connecting the third member to the one right angle member in a manner that permits rotation of the third member relative to said right angle member, said members having means to engage and close opposed legs of a clip on a spacing member in the process of disposing the clip in locking engagement with the spacing member.

2. The device of claim 1 in which the other of the right angle members has a fixed handle.

3. The device of claim 2 in which a spring is connected between the fixed and rotatable handles, the spring being effective to restore the rotatable handle to an original position after it is moved from such a position.

4. The device of claim 2 in which the length of the fixed and rotatable handles provides a mechanical advantage that requires a minimum exertion to effect locking engagement between a clip and spacing member.

5. The device of claim 1 in which a spring is connected between the third member and the one right angle member, the spring being effective to restore the third member to an original position after it is moved from such a position.

6. The device of claim 1 in which the right angle members are connected together by mechanical links that pivot relative to the members.

7. A device for placing two clips in locking engagement with the respective ends of a spacing member, the device comprising:
    a center member,
    two right angle members disposed adjacent the respective ends of the center member and in a manner that places one extension of each of said members in a generally perpendicular relationship to the longitudinal axis of the center member,
    means mechanically connecting the two right angle members to the center member in a manner that permits relative longitudinal movement therebetween,
    two rotatable handles located for effecting relative longitudinal movement of the center and right angle members,
    a spring located between and connected to the right angle members to effect return of the members to an at-rest position after they are moved from such position, and a third member disposed at the end of the extension of each right angle member that is perpendicular to the center member and configured to engage the base of a clip, means mechanically connecting each of said third members respectively to the right angle members in a manner that permits rotation of each third member relative to the right angle members, said right angle and third members having means to engage and close opposed legs of the clips on a spacing member.

8. The device of claim 7 in which a spring is connected between the third and right angle members, the spring being effective to restore each third member to a position for receiving the base of a clip after a previous clip is disposed in locking engagement with a spacing member.

9. The device of claim 7 in which the center and right angle members are connected together by mechanical links that pivot relative to the members.

10. The device of claim 7 in which the length of the rotatable handles provides a mechanical advantage that requires minimum exertion to effect locking engagement between the clips and a spacing member.

11. The device of claim 7 including two fixed handles located adjacent the rotatable handles.

* * * * *